(12) United States Patent
Williams et al.

(10) Patent No.: US 10,289,668 B2
(45) Date of Patent: May 14, 2019

(54) SYSTEM AND METHOD OF POPULATING A WELL LOG

(71) Applicant: LANDMARK GRAPHICS CORPORATION, Houston, TX (US)

(72) Inventors: Michael R. Williams, Houston, TX (US); Mauricio A. Pachon, Spring, TX (US); James M. Wang, Bellaire, TX (US); Carlo C. Ayuste, Houston, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 709 days.

(21) Appl. No.: 14/655,317

(22) PCT Filed: Jan. 18, 2013

(86) PCT No.: PCT/US2013/022191
§ 371 (c)(1),
(2) Date: Jun. 24, 2015

(87) PCT Pub. No.: WO2014/113021
PCT Pub. Date: Jul. 24, 2014

(65) Prior Publication Data
US 2015/0324344 A1 Nov. 12, 2015

(51) Int. Cl.
*G06F 17/24* (2006.01)
*G01S 19/42* (2010.01)
*E21B 47/00* (2012.01)
*G01V 9/00* (2006.01)
*G01V 11/00* (2006.01)

(52) U.S. Cl.
CPC ............ *G06F 17/243* (2013.01); *E21B 47/00* (2013.01); *G01S 19/42* (2013.01); *G01V 9/00* (2013.01); *G01V 11/00* (2013.01)

(58) Field of Classification Search
CPC ........ G06F 3/048; G06F 17/243; G06F 17/40; G06F 19/42; G06F 47/00; E21B 47/00
See application file for complete search history.

(56) References Cited

U.S. PATENT DOCUMENTS 5,576,973 A * 11/1996 Haddy ..................... G01V 3/15
 342/357.25
6,498,988 B1 12/2002 Robert et al.
(Continued)

OTHER PUBLICATIONS

European Patent Office, Supplementary European Search Report, dated Jun. 23, 2016, 6 pages, Europe.
(Continued)

*Primary Examiner* — Wilson W Tsui

(57) ABSTRACT

Populating a well log. At least some of the illustrative embodiments are methods including: performing a well logging operation at a physical location of a wellbore, the performing by: positioning a logging system proximate to the physical location of the wellbore; determining, by a computer system associated with the logging system, a physical location of the logging system; reading, by the computer system, from a third party source, information related to the physical location of the logging system; populating, by the computer system, a header section of a well log report, the populating based on information from the third party source; and performing the well logging operation.

19 Claims, 8 Drawing Sheets

(56) References Cited

U.S. PATENT DOCUMENTS

| | | | |
|---|---|---|---|
| 6,829,570 B1 | 12/2004 | Thambynayagam et al. | |
| 8,615,082 B1* | 12/2013 | Selman | E21B 47/00 340/853.2 |
| 8,749,610 B1* | 6/2014 | Gossweiler | H04L 12/1827 348/14.08 |
| 2002/0038353 A1* | 3/2002 | Yamamoto | G01W 1/02 709/217 |
| 2003/0042020 A1* | 3/2003 | Newman | E21B 47/00 166/250.15 |
| 2003/0074139 A1 | 4/2003 | Poedjono | |
| 2003/0183382 A1* | 10/2003 | Newman | E21B 37/00 166/66 |
| 2007/0294360 A1* | 12/2007 | Ebling | A61B 5/14532 709/208 |
| 2008/0179094 A1 | 7/2008 | Repin et al. | |
| 2009/0024443 A1 | 1/2009 | Graham et al. | |
| 2009/0225630 A1 | 9/2009 | Zheng et al. | |
| 2009/0243852 A1* | 10/2009 | Haupt | G01W 1/00 340/541 |
| 2010/0114493 A1 | 5/2010 | Vestal | |
| 2012/0024181 A1 | 2/2012 | Von Lengeling et al. | |
| 2012/0026002 A1* | 2/2012 | Vu | E21B 47/00 340/854.6 |
| 2013/0091452 A1* | 4/2013 | Sorden | G06F 3/048 715/771 |

OTHER PUBLICATIONS

International Search Report and Written Opinion, dated Oct. 10, 2013, 11 pages; Korean International Searching Authority.

http://wellservicingmagazine.com/well-location-maps-pointing-way, Well Location Maps—Pointing the Way, Nov. 8, 2012, 2 Pages.

Emmanuel Olayinka Ajayi and Sylvester Efe Owhojeta, GPS Data Integration into GIS for Offshore Facilities Management Chevron Nigeria Experience, Jun. 19, 2008, 8 Pages.

http://www.fieldingsystems.com/products/fieldvisortablet.aspx, Field Data Capture Tablet App, Nov. 1, 2012, 4 Pages.

* cited by examiner

|  |  | TEST HEADER | |
|---|---|---|---|
| HALLIBURTON 12345678 COMPANY WELL FIELD/BLOCK COUNTY STATE | COMPANY | | |
| | WELL | | |
| | FIELD/BLOCK | | |
| | COUNTY | | STATE |
| | AP: No<br>Location | | Other Services |
| | Sect. Twp Pge. | | |

| | | | | |
|---|---|---|---|---|
| Permanent Datum | GL | Elev 1.0 ft | Elev KB. | 0.0 ft |
| Log measured from | KB | above perm. Datum | df. | 0.0 ft |
| Drilling measured from | KB | | gl. | 0.0 ft |
| Date | | | | |
| Run No | 5 | | | |
| Depth-Driller | | | | |
| Depth-Logger | | | | |
| Bottom-Logged interval | | | | |
| Top-Logged interval | | | | |
| Casing-Driller | | @ | @ | @ |
| Casing-Logger | | | | |
| Bit Size | | | @ | @ |
| Type Fluid In Hole | | | | |
| Density / Viscosity | | | | |
| PH / Fluid Loss | | | | |
| Source of Sample | | | | |
| Rm @ Meas. Temperature | | @ | @ | @ |
| Rmf@Meas. Temperature | | @ | @ | @ |
| Rmc@Meas. Temperature | | @ | @ | @ |
| Source Rmt / Rmc | | | | |
| Rm @ BHT | | @ | @ | @ |
| Time Source Circulation | | | | |
| Time on Bottom | | | | |
| Max Rec Temperature | | @ | @ | @ |
| Equipment / Location | MxWS | M2R10 | | |
| Recorded By | JAVIER GONZALES | | | |
| Witnessed By | MICHAEL WILLIAMS | | | |

*FIG.2*

SYSTEM AND METHOD OF POPULATING A WELL LOG

CROSS-REFERENCE TO RELATED APPLICATIONS

This application is a U.S. National Stage patent application of International Patent Application No. PCT/US2013/022191, filed on Jan. 18, 2013, the benefit of which is claimed and the disclosure of which is incorporated herein by reference in its entirety.

BACKGROUND

Data regarding the development and production of a well may be logged in a well log, where the well log comprises data values regarding physical parameters of the formations penetrated by the wellbore. In addition, the well log may comprise a well log header, which contains information related to the logging operation, but not necessarily obtained from measurements and observations. Populating the header well log may be difficult and time consuming, as well as inaccurate, and thus any method and system to hasten the process as well as improve accuracy would be valuable.

BRIEF DESCRIPTION OF THE DRAWINGS

For a detailed description of exemplary embodiments, reference will now be made to the accompanying drawings in which:

FIG. 2 shows a portion of an example well log in accordance with at least some embodiments;

NOTATION AND NOMENCLATURE

Figure 1:
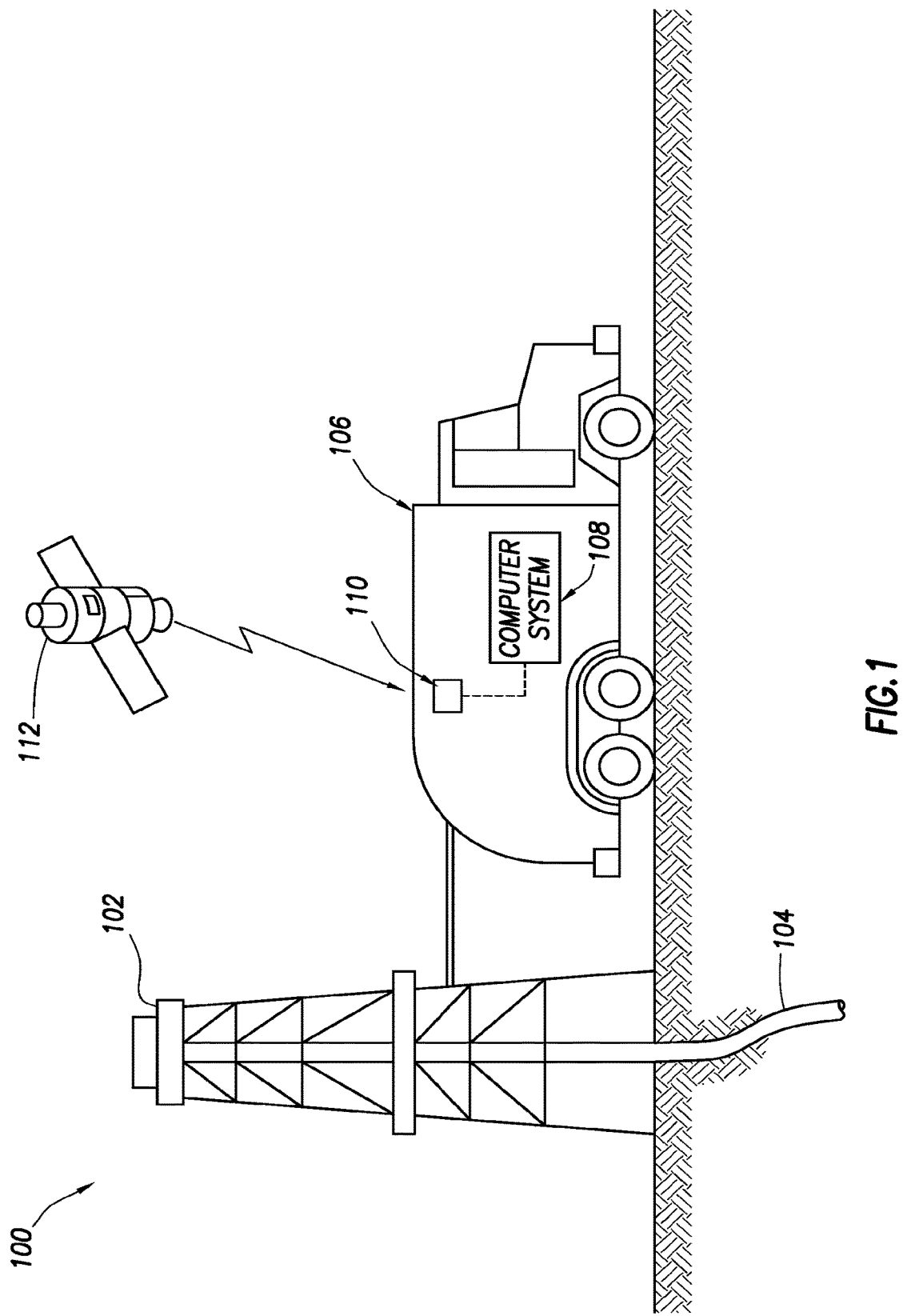
FIG. 1 shows a logging operation in accordance with at least some embodiments.

Certain terms are used throughout the following description and claims to refer to particular system components. As one skilled in the art will appreciate, different companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Wellbore" shall mean a hole drilled into the Earth's crust used directly or indirectly for the exploration or extraction of natural resources, such as oil, natural gas or water.

"Well log values" shall mean a plurality of values of an attribute of one or more earth formations penetrated by a wellbore.

"Well log header" shall mean a portion of a well log containing a plurality of wellbore related information not related to the attribute of well log values.

"Real-time" shall mean that the event indicated to be in "real-time" takes place within 5 minutes or less of a trigger event.

"Remote" shall mean one kilometer or more.

"Geolocation" shall mean a descriptive location (e.g. street address), as opposed to a location described in geographic coordinates (i.e., latitude and longitude.)

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various embodiments are directed to methods and systems for automatically populating and/or updating a well log header with logging operation location-based data. The various embodiments are discussed in terms of a single wellbore penetrating one or more Earth formations. The single wellbore has associated therewith at least one set of well log values, where each set of well log values represents a physical parameter associated with the formation penetrated by the wellbore or the wellbore itself. Additionally, each well log associated with a wellbore comprises a well log header, where the well log header is comprised of information related to the wellbore as a whole.

In particular, the various embodiments describe a computer system coupled to a logging operation that communicates with at least one, and in some cases a plurality of location-determining technologies to determine an accurate location of the logging operation at a well bore. Once the location of the logging operation at the well bore is determined, the computer system communicates with third party sources to obtain location-based data related to the location of the logging operation. The location-based data is then used to populate and/or update a well log header associated with the logging operation. The specification first turns to an overview of a logging operation and well logging.

FIG. 1 shows a logging operation 100 in accordance with at least some embodiments. In particular, FIG. 1 illustrates a derrick 102 and a wellbore 104, as part of logging operation 100. Additionally, FIG. 1 shows a wireline truck 106 coupled to the logging operation 100. Wireline truck 106 may comprise a computer system 108, where computer system 108 is communicatively coupled to the Internet by way of a wireless network connection (not specifically shown). The computer system 108 may be coupled to a plurality of location-data receiving devices such as, for example, a global position system receiver 110 receiving communication from a plurality of GPS satellites, such as satellite 112.

At various times during the creation of wellbore 104, or after production from wellbore 104 has begun, data regarding physical parameters of the one or more formations penetrated by the wellbore may be gathered. For example, the drill string supported by derrick 102 creating the wellbore 104 may include measuring-while-drilling or logging-while-drilling devices that read physical parameters of the wellbore and/or formations as the drillbit creates the wellbore 104. Further, at various times during the drilling process, the drill string may be removed or "tripped" from the wellbore 104, and a wireline logging tool from wireline truck 108 run in the wellbore 104, where the wireline logging tool gathers data regarding the physical parameters of the wellbore and/or formations penetrated by the wellbore 104. Further still, after drilling is complete, wellbore 104 is cased, and the derrick 102 is removed, additional logging data may be gathered by a wireline logging tool from wireline truck 108. Regardless of the precise nature of the parameters that a particular data set contains, in order to be useful, the data sets are presented to an interested party by way of a display device of a computer system in a form known as a well log. FIG. 2 shows an illustrative view of a portion of a well log for purposes of discussion.

In particular, FIG. 2 shows an example well log header 200. A log values section (not specifically shown) may comprise data as described previously, that is, data regarding physical parameters of the formations penetrated by the wellbore. The header 202 may contain formation about the wellbore itself or data about the particular logging run to which the associated well log as a whole applies. The example well log header 200 of FIG. 2 represents a small portion of the data that need be entered. A non-limiting list of well log head data may include information such as: the name of the well operator; the name of the company that performed the well logging operation; the geographic coordinates of the well; the elevation of the location of the well; units of measure for data within the log data portion of the well log; or the name of the well to which the well log applies. This list is merely illustrative, as there may be 350 or more data points within the header data most of which may be automatically populated by the methods described herein.

The well log data, including the log header 200, may take a variety of forms. For example, when stored in electronic format the well log data may be in Log Information Standard (LIS), digital LIS (DLIS), log ASCII standard (LAS). Additionally, well log data may be converted from its native standard to a standard more suitable for viewing, access, and manipulation by software executing on a computer system. In some embodiments, the well log data is read in its native standard and converted to extensible markup language (XML), although any currently available or after-developed standard suitable for computer reading and writing may be equivalently used.

Populating and/or updating the well log header 200 is a laborious, time-consuming, and error prone task for an engineer to enter by hand. As a result, the company performing the well logging operation may lose time and money, as well as accuracy, by depending on human labor to populate the well log header 200 with data. In addition, at least some of the well log header 200 data relies on information related to the physical location of the logging operation. Thus, in order to expedite the process of populating the well log header 200, as well as improving the accuracy of the data, the location of the logging operation is automatically determined by way of at least one of a plurality of location determining systems, and information related to the determined location is retrieved from third parties in order to automatically populate the well log header 200. The specification first turns to several example systems and methods for determining location. So as not to unduly complicate the disclosure, discussion of various example systems and methods for determining secondary information (e.g., lease name, well name) based on the location are held in abeyance until after the discussion of determining location, even where the physical mechanism for determining the secondary information may overlap.

Figure 3:
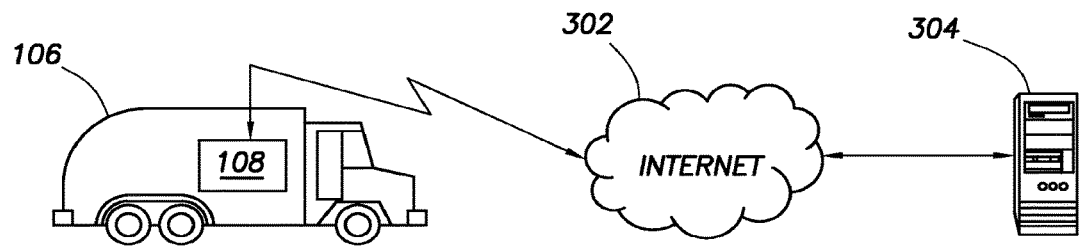
FIG. 3 shows a logging operation coupled to an Internet communication system in accordance with at least some embodiments.

In one example system, the location of the logging operation may be determined by using methods and systems associated with the Internet to determine location. FIG. 3 shows an example logging systems comprising a wireline truck 106 coupled to the Internet 302 and a remote computer system 304. In particular, computer system 108 associated with the wireline truck 108 is coupled to the Internet 302, in many cases the communicative coupling of the computer system 106 to the Internet involves a wireless connection for at least one hop; however, the network may be any of a variety of networks including local and/or wide area networks, and including wired and wireless networks, or combinations thereof. In addition, the remote computer system 304 is coupled to the Internet 302.

In the example systems, the location of computer system 108 may be determined by mapping an internet protocol (IP) address to a location. In particular, location determination over the Internet may involve first determining the IP address assigned to the computer system 108 by the Internet service provider, and second, using secondary sources to determine information related to that IP address. In one embodiment, location (at least within several miles) may be determined by ascertaining the identity of the Internet service provider. In particular, software running on computer system 108 may query IP registration databases, by way of application programming interfaces (APIs), in order to determine the owner of, and thus the location of, the IP address associated with a specific computer.

Some primary sources for IP address data may include regional Internet registries which allocate and distribute IP address to organization location in the registries' respective service regions. Examples of regional Internet registries include: the American Registry for Internet Number (ARIN) and the RIPE Network Coordination Centre (RIPE NCC). Secondary sources may include data mining or user-submitted geographic location data. For example, computer system 108 may be connected wirelessly to a wireless network, and an administrator may register the wireless network, thus providing identifying information such as the name of the company and the address.

In another embodiment, location may be determined by running a "traceroute," where "traceroute" is a computer network diagnostic tool available on a plurality of operating systems. In particular, when information packets travel through the Internet, the packets pass through several computers in a hierarchical fashion. Tracerouting looks at each "hop" (i.e., each move from one node to another node) in order to determine the time it takes for data to travel from each node. The geolocation of each hop may be identified by referencing the data within a geolocation database. At the destination computer system, therefore, data such as country; region/county; city; postal code; latitude and longitude; and time zone, may be provided. The location information determined based on information associated with Internet may provide good information regarding location in political boundary sense. That is, information associated with the Internet may be sufficient to establish location information such as country, state, county, and city. In the context of wireline truck 106 having a computer system 108, the precise access point to the Internet for the computer system 106 may change with each re-location of the wireline truck 106, and thus the resolution of the location information may be limited. For example, location information associated with the Internet alone may not be of sufficient resolution to unambiguously ascertain location sufficient to programmatically determine a lease name, or a well name, or precise geographic coordinates. Thus, in addition to, or in place of the Internet-based location, further location information may be gathered and used.

In another example system, location of the logging operation may be determined by way of a GPS receiver directly associated with the logging operation. Returning again to FIG. 1, wireline truck 106 may comprise computer system 108 coupled to GPS receiver 110. The GPS receiver 110 receives signals from an array of GPS satellites orbiting the earth, such as satellite 112, and based on timing associated with the arrival of those signals, a position can be determined. In some cases, the GPS receiver 110 has sufficient functionality to calculate position, and thus the data provided to the computer system 108 may be a direct indication of position (latitude and longitude). In other cases, the functionality to determine position may be shared between the GPS receiver 110 and software executing on computer system 108. That is, the GPS receiver 110 may receive the plurality of GPS signals and pass the information to a program executing on the computer system 108, which program may then make the determination as to the location of the wireline truck 106, and thus the logging operation.

Figure 4:
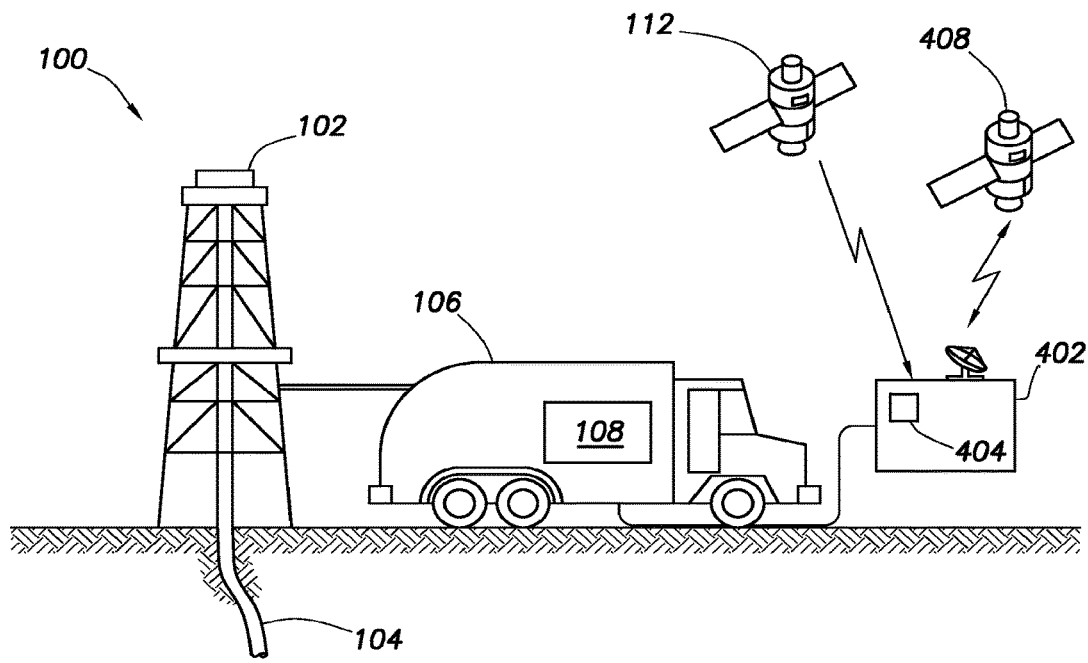
FIG. 4 shows a logging operation coupled to a satellite transceiver in accordance with at least some embodiments.

In yet another example system, location of the logging operation may be determined by way of a satellite transceiver associated with the logging operation. FIG. 4 shows a logging operation comprising satellite transceiver 402. In particular, wireline truck 106 comprises computer system 108 which is communicatively coupled and to a satellite transceiver 402. By way of the satellite transceiver 402, the computer system 108 may communicate with one or more remote computer systems (not specifically shown) over communication satellite 408. In the example system shown, the satellite transceiver 402 may comprise an integrated GPS receiver 404 which receives signals from the constellation of GPS satellites illustrated by satellite 112. In some cases, the satellite transceiver 402 has sufficient functionality to calculate position. In other cases, the functionality to determine position may be shared between the satellite transceiver 402 and software executing other computer systems (e.g., computer system 108 or a computer system communicatively coupled by way of the communication satellite 408). That is, the GPS receiver 404 may receive the plurality of GPS signals and pass the information to a program executing on a remote computer system, which program may then make the determination as to the location satellite transceiver 402 and thus the logging operation.

Regardless of the precise configuration of the logging system, location information may be directly or indirectly obtained based on the GPS receiver 404. For example, in some example systems the computer system 108 may directly query the GPS receiver 404 in the satellite transceiver for location information. In other cases, the location information of the GPS receiver 404 may be communicated by way of the example satellite 408 to the service provider that provides communicative access to the Internet over the satellite. Thus, the computer system 108, using Internet-based location methods, may indirectly ascertain location as determined by the GPS receiver 404.

Figure 5:
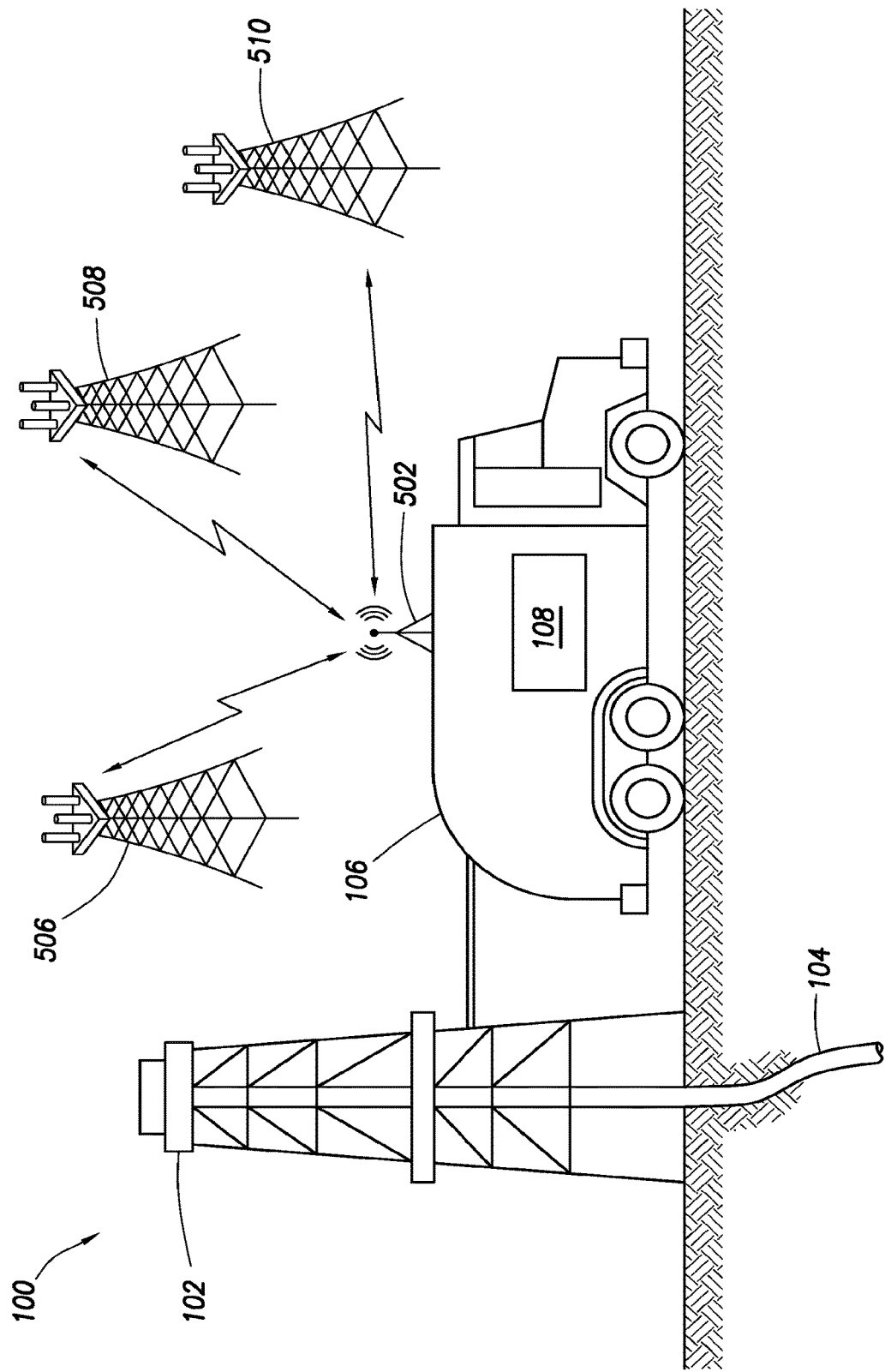
FIG. 5 shows a logging operation coupled to a cellular communication system in accordance with at least some embodiments.

In yet another embodiment, location of the logging operation may be determined based on signals received by a cellular antenna proximate to the logging operation. FIG. 5 shows a logging operation where the wireline truck 106 (and more particularly the computer system 108) is communicatively coupled to a plurality of cellular towers 504, 506, and 508 by way of a cellular antenna 502. In accordance with these example methods and systems, the location of the cellular antenna 502 coupled to the wireline truck 106, and thus the location of the logging operation, may be determined by multilateration of radio signals between the several example cellular towers 504, 506 and 508. Although three towers are shown in FIG. 5, three or more towers may be used. By measuring the signal strength and the time it takes for communicative signals to make a round-trip between the antenna 502 and the respective cellular towers 506, 508, and 510, a location may be determined. More particularly, based on knowledge of the location of each cellular tower, each measurement between the cellular antenna 502 and a cellular tower narrows the area in which the transmitting antenna may be located, and with each measurement logically overlaid a position of the antenna 502 is determined.

Figure 6:
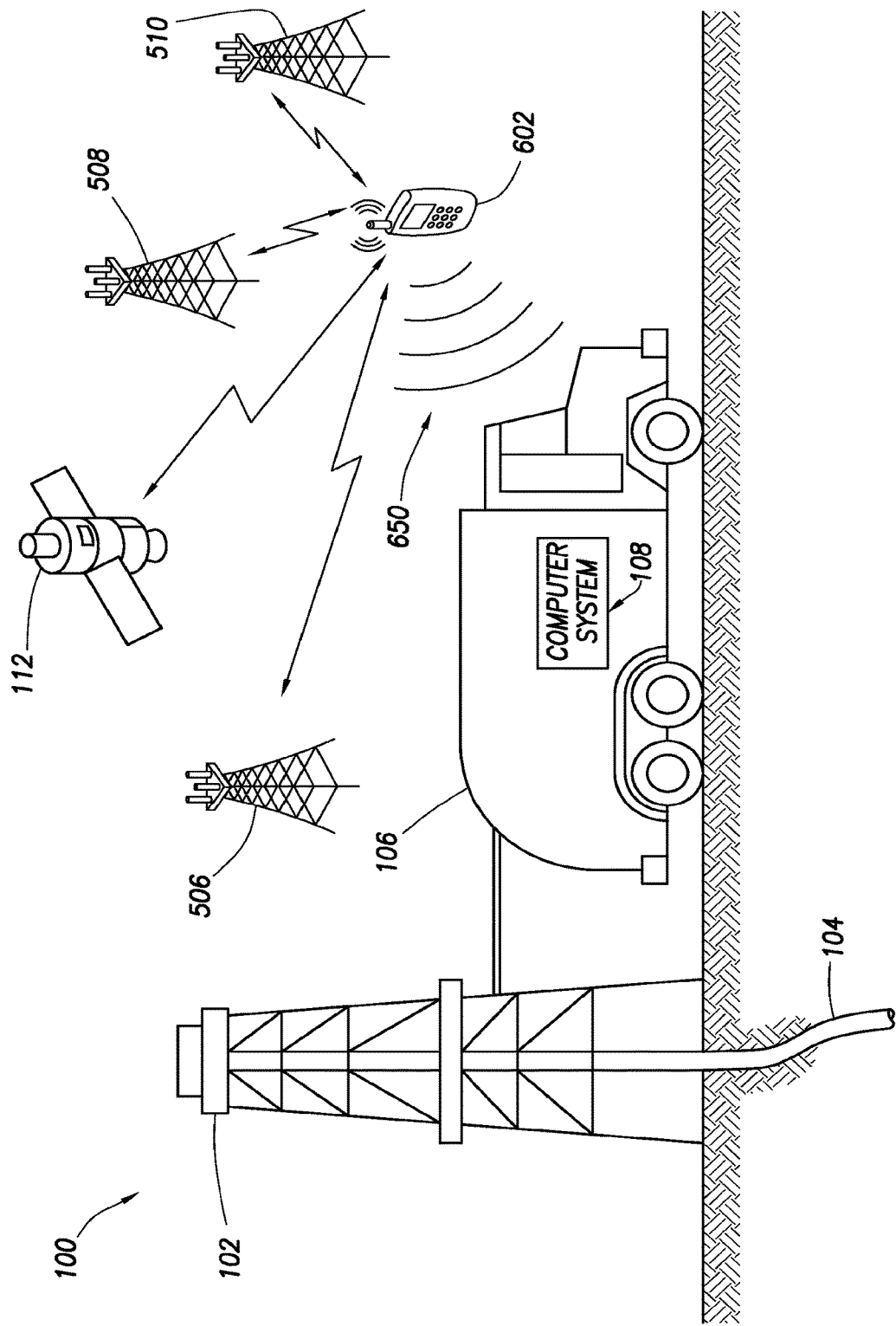
FIG. 6 shows a logging operation coupled to a mobile cellular communication system in accordance with at least some embodiments.

In yet another example system, location of the logging operation may be indirectly determined based on a mobile cellular device located at the well site, where the mobile cellular device determines its location. FIG. 6 shows a logging operation comprising a wireline truck 106 (an associated computer system 108). In the vicinity of the wireline truck 106 is mobile cellular device 602, which mobile cellular device which is shown to be communicatively coupled to three cellular towers 506, 508, and 510. Thus, in some example systems mobile cellular device 602 may determine its position by multilateration, as previously described. The example mobile cellular device 602 may also have an onboard GPS receiver, which enables the mobile cellular device 602 to determine position based on signals received from GPS satellites, illustrated by satellite 112.

Regardless of how the mobile cellular device 602 determines position, in the example systems and methods the computer system 108 may be communicatively coupled to the mobile cellular device 602 by a short-range communication protocol, such as a Bluetooth network, a Zigbee network, or the like. The communicative coupling between the computer system 108 and the mobile cellular device 602 shown by electromagnetic waves 650. Thus, the computer system 108 may read a location indication from the mobile cellular device 602 as part of establishing location of the logging operation.

In yet still other example systems, hybrid positioning systems may involve a combination of network-based and handset-based technologies for location determination. One example would be some modes of Assisted GPS, which can both use GPS and network information to compute the location. The specification now turns to how the location information is used with respect to programmatically populating a well log header.

Regardless of the method by which the location of the logging operation is determined, once the location is determined, the example computer system 108 may communicate with at least one third party server in order to request and receive location related information. The communication pathway for computer system 108 to communication with the third party server may take many forms. In systems such as FIG. 4, the communicative coupling of the computer system 108 to the Internet (and thus the third party servers) may be by way of satellite communication through satellite transceiver 402. In systems such as FIG. 5, the communicative coupling of the computer system 108 to the Internet (and thus the third party servers) may be by way of cellular based data communications. In systems such as FIG. 6, the communicative coupling of the computer system 108 to the Internet (and thus the third party servers) may be by way of mobile cellular device 602.

Figure 7:
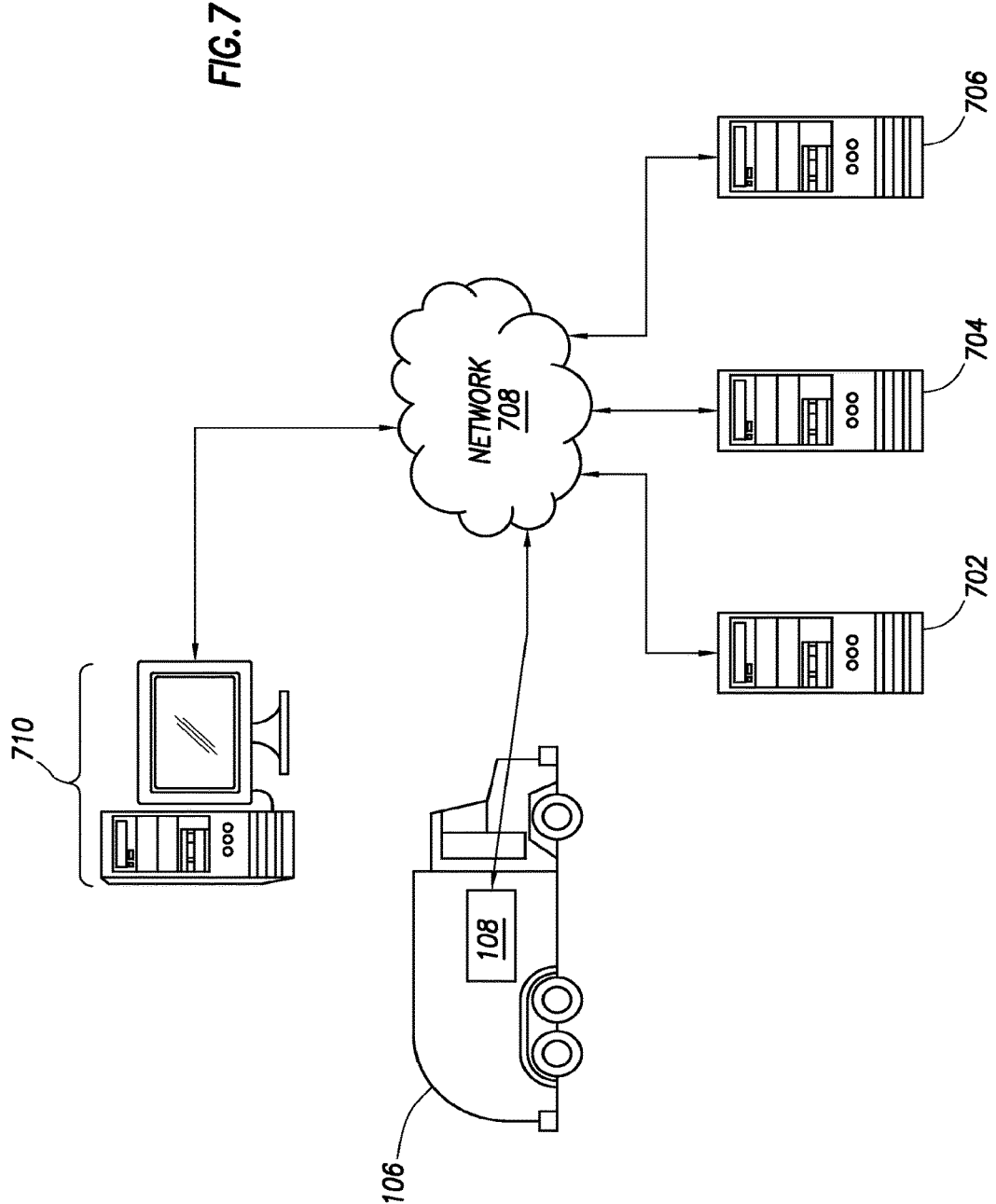
FIG. 7 shows a logging operation communicating with third party servers in accordance with at least some embodiments.

FIG. 7 shows an example system of the communicating with third party servers to obtain information related to the physical location of a logging operation. In particular, FIG. 7 shows wireline truck 106 communicatively coupled to example third party servers 702, 704, and 706 by way of a network 708, which network may comprise, in part, the Internet. Likewise, the example third party servers 702, 704 and 706 may also have network connections to network 708, thus enabling communications and transfer of data between the computer systems 108 and third party servers 702, 704, and 706. While three third party servers are shown in FIG. 7, any number of third parties may be queried. In one embodiment, a third party server may host a website, as well as may provide an application programming interface (API) over which the computer system software of the logging operation may communicate with the third party hosting the web application in order to receive applicable information. Based on the location information previously determined by the computer system 108, the computer system 108 may communicate with the example third party servers 702, 704, and 706 to obtain the information related to the physical location of the logging operation.

In another embodiment, the location information that has been determined previously may be transferred from the computer system 108 to a remote computer system 710. Computer system 710 may then communicate over network 708 in order to request and receive the information related to the physical location of the logging operation. The specification now turns to examples of information related to the physical location of the logging operation, where some or all the information may finds its way to a well log header 200 either directly or indirectly.

For example, the computer system associated with the logging operation may want to receive information related to the weather at the determined location of the logging operation. The computer system 108, now having received the determined location of the logging operation, requests weather information from a weather source, such as the National Oceanic and Atmospheric Administration (NOAA) over network 708. NOAA provides a National Weather Service API (NWS API) and responds to requests by returning a response in an XML language. Thus, the software executing on the computer system 108 interacts with the API in order to provide the location data to the example NOAA website and receive, in return, weather data related to the location possibly in the form of XML code. The received weather data may then be inserted into the proper place within the well log header 200, either to populate a previously empty data slot, or to update the data already stored within the header.

In another embodiment, the computer system 108 may perform an information extraction. In an information extraction, a software program executing on the computer system 108 may query at least one third party server from which location-based data is sought. The query results in collecting relevant data by way of, for example, Hypertext Transfer Protocols (HTTP), in order to extract contents contained in the Hypertext Markup Language (HTML) documents, the information which may then be integrated with software programmed to populate the well log header. In yet another embodiment, software executing on computer system 108 may extract data from data sources stored on web servers, such as data stored in networked databases, by utilizing text pattern matching and table-based searching.

Regardless of which method is used to extract data from third party servers, computer system 108 automatically retrieves data related to the determined location of the logging system. The retrieved location-based data is then used to automatically populate or update the well log header. Data which is auto-populated to the well log header may include location-based information such as the geolocation of the logging system (e.g., country, county, state, and city); weather information (e.g., barometric pressure, temperature, dew point and humidity); elevation at the logging site; the hydrocarbon lease name on which the logging system is located; a well identifier of the wellbore at the physical location, as well as other information.

Figure 8:
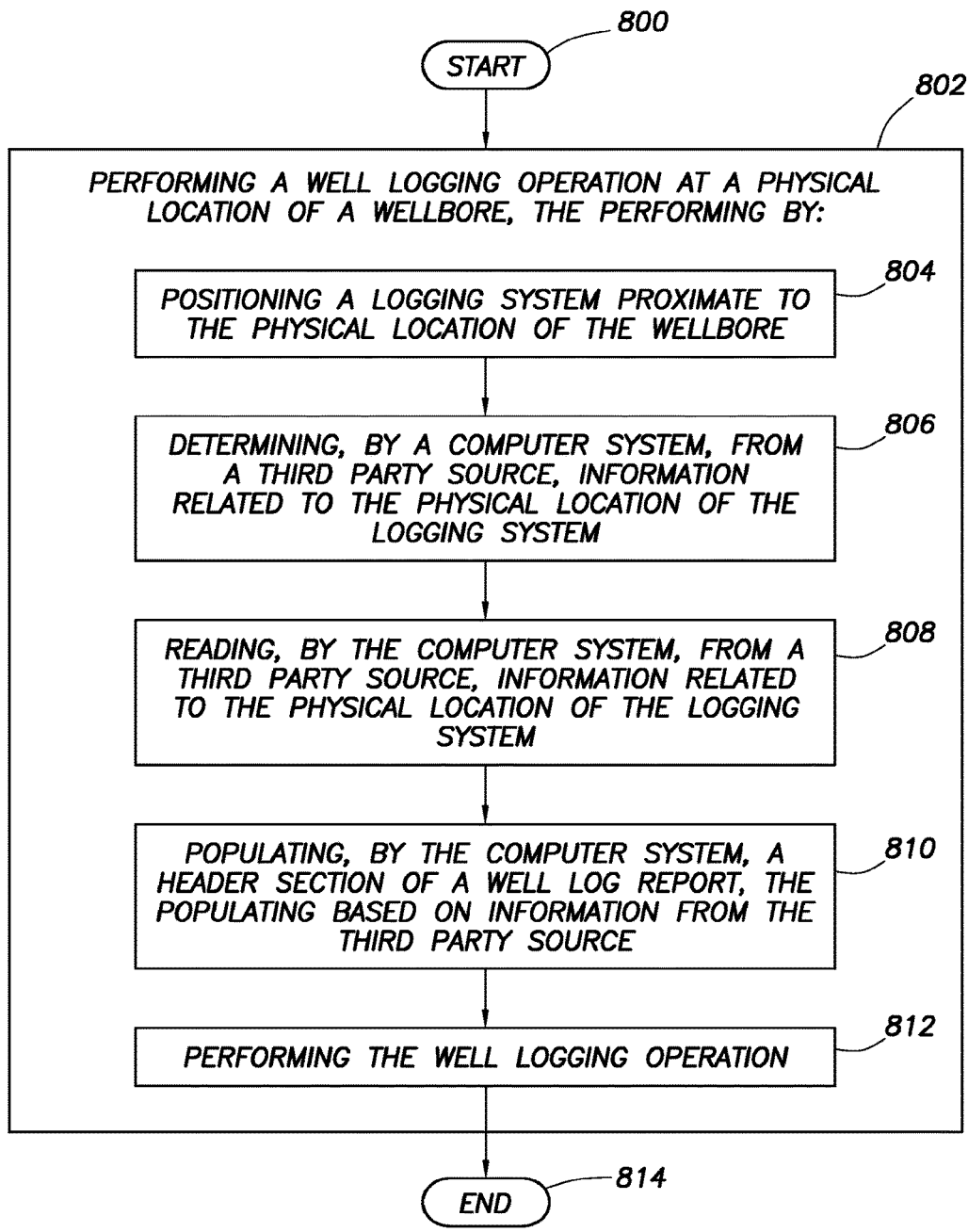
FIG. 8 shows a method in accordance with at least some embodiments.

The method of performing an automatic well logging operation will now be discussed in more detail. FIG. 8 shows a flow diagram depicting an overall method of performing a well logging operation. The method starts (block 800), and begins with performing a well logging operation at a physical location of a wellbore (block 802), the performing by: positioning a logging system proximate to the physical location of the wellbore (block 804); determining, by a computer system associated with the logging operation, a physical location of the logging operation (block 806); reading, by the computer system, from a third party source, information related to the physical location of the logging operation (block 808); populating, by the computer system, a header section of a well log report, the populating based on information from the third party source (block 810); and then performing the well logging operation (block 812). Thereafter, the method ends (block 814).

Figure 9:
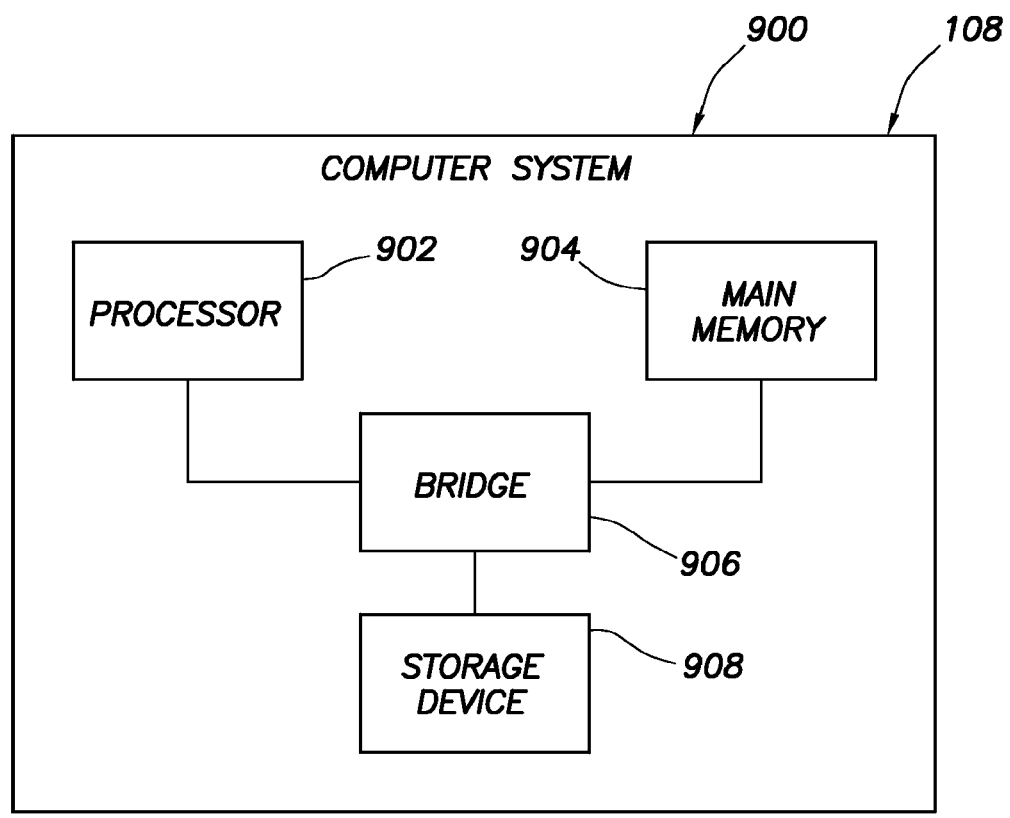
FIG. 9 shows, in block diagram form, a computer system in accordance with at least some embodiments.

FIG. 9 shows a computer system 900, which is illustrative of a computer system upon which the various embodiments may be practiced. The computer system 900 may be illustrative of, for example, computer system 108 coupled to the wireline truck 106. The computer system 900 comprises a processor 902, and the processor couples to a main memory 904 by way of a bridge device 906. Moreover, the processor 902 may couple to a long term storage device 908 (e.g., a hard drive, solid state disk, memory stick, optical disc) by way of the bridge device 906. Programs executable by the processor 902 may be stored on the storage device 908, and accessed when needed by the processor 902. The program stored on the storage device 908 may comprise programs to implement the various embodiments of the present specification, such communicating with a GPS receiver in order to determine location, as well as communicating with third parties to read information related to the determined location of the logging operation. In some cases, the programs are copied from the storage device 908 to the main memory 904, and the programs are executed from the main memory 904. Thus, the main memory 904, and storage device 908 shall be considered computer-readable storage mediums.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a non-transitory computer-readable medium (i.e., not a carrier wave) that stores a software program to implement the method aspects of the various embodiments.

References to "one embodiment," "an embodiment," "some embodiments," "various embodiments," "example systems," "example methods" or the like indicate that a particular element or characteristic is included in at least one embodiment of the invention. Although the phrases may appear in various places, the phrases do not necessarily refer to the same embodiment.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of performing well logging operations, the method comprising:
    obtaining, by a computer system from a global positioning system (GPS) receiver associated with a logging system, location information for the logging system proximate to a wellbore being drilled through one or more formations;
    determining, by the computer system, a physical location of the logging system, based on the location information obtained from the GPS receiver;
    requesting, by the computer system from a third party server via a communication network, location-based information related to the wellbore at the physical location of the logging system;
    obtaining, by the computer system from the logging system, logging data regarding physical parameters of the one or more formations as the wellbore is drilled;
    responsive to receiving the requested location-based information from the third party server via the communication network, populating, by the computer system, a header section of a well log report with the location-based information received from the third party server and a log values section of the well log report with the logging data obtained from the logging system; and
    displaying, by the computer system, the populated well log report, wherein the displayed well log report is automatically updated with additional location-based information received from the third party server and additional logging data obtained from the logging system as the wellbore is drilled through additional formations.

2. The method of claim 1 wherein determining the physical location of the logging system further comprises reading latitude and longitude coordinates from the global positioning system (GPS) receiver associated with the logging system.

3. The method of claim 2 wherein the GPS receiver is part of the logging system.

4. The method of claim 2 wherein the GPS receiver is part of a satellite transceiver associated with the logging system.

5. The method of claim 2 wherein the GPS receiver is part of a mobile cellular device wirelessly coupled to the logging system.

6. The method of claim 1 wherein the physical location of the logging system is determined based on a location of a mobile cellular antenna communicatively coupled to the computer system, and the location of the mobile cellular antenna is determined based on a multilateration of cellular signals received by the mobile cellular antenna from a plurality of cellular towers.

7. The method of claim 1 wherein the physical location of the logging system is determined based on information received from location services provided to the computer system over an Internet connection.

8. The method of claim 7 wherein the information received from the location services includes an internet protocol (IP) address associated with the logging system.

9. The method of claim 1 wherein the location-based information received from the third party server is selected from the group consisting of: an indication of a country where the logging system is located; an indication of a state where the logging system is located; an indication of a county where the logging system is located; an indication of a city in which the logging system is located; an indication of a nearest city to which the logging system is located; an indication of a hydrocarbon lease name on which the logging system is located; an indication of a well identifier of the wellbore; a weather report for an area that includes the physical location of the logging system; a temperature from a weather reporting station proximate to the physical location of the logging system; a humidity from the weather reporting station proximate to the physical location of the logging system; and a dew point from the weather reporting station proximate to the physical location of the logging system.

10. The method of claim 9 wherein requesting further comprises interfacing with a web application programming interface ("Web API") controlled by a third party service provider associated with the third party server.

11. A well logging system comprising:
    a processor;
    a memory coupled to the processor;
    a global positioning system (GPS) receiver coupled to the processor; and
    a communication interface coupled to the processor;
    the memory storing a program that, when executed by the processor causes the processor to:
    determine a physical location of the well logging system proximate to a wellbore being drilled through one or more formations, based on location information obtained by the GPS receiver;
    retrieve, from a third-party server via a communication network coupled to the communication interface, location-based information related to the wellbore at the physical location of the well logging system;
    obtain, from a logging-while-drilling device coupled to a drill string disposed in the wellbore, logging data regarding physical parameters of the one or more formations as the wellbore is drilled;
    populate a header section of a well log report with the location-based information retrieved from the third-party source and a log values section of the well log report with the logging data obtained from the logging-while-drilling device; and
    provide, for display by a display device, the populated well log report, wherein the well log report is automatically updated with additional location-based information received from the third party server and additional logging data obtained from the logging-while-drilling device as the wellbore is drilled through additional formations.

12. The well logging system of claim 11 wherein the location information obtained from the GPS receiver includes latitude and longitude coordinates corresponding to the physical location of the well logging system.

13. The well logging system of claim 12 further comprising a satellite transceiver coupled to the processor, wherein the GPS receiver is associated with the satellite transceiver.

14. The well logging system of claim 11 wherein when the processor determines, the program causes the processor to determine the physical location based on location services over an Internet connection.

15. The well logging system of claim 14 wherein the program further causes the processor to determine the physical location based on location services by way of an internet protocol (IP) address lookup.

16. The system of claim 11 wherein when the processor determines, the program further causes the processor to read a position from a mobile cellular device, the mobile cellular device wirelessly coupled to the well logging system by way of the communication interface.

17. The system of claim 11 wherein when the processor determines, the program further causes the processor to read a position from a mobile cellular device, the mobile cellular device comprising a separate global positioning system (GPS) receiver, and the mobile cellular device wirelessly coupled to the well logging system by way of the communication interface.

18. The system of claim 11 wherein when the processor determines, the program further causes the processor to read a position from a mobile cellular device, the location determined based on triangulation of cellular signals.

19. The well logging system of claim 11 wherein the location-based information retrieved from the third party server is selected from the group consisting of: an indication of a country where the well logging system is located; an indication of a state where the well logging system is located; an indication of a county where the well logging system is located; an indication of a city in which the well logging system is located; an indication of a nearest city to which the well logging system is located; an indication of a hydrocarbon lease name on which the well logging system is located; an indication of a well identifier of the wellbore proximate to the physical location of the well logging system; a weather report for an area that includes the physical location of the well logging system; a temperature from a weather reporting station proximate to the physical location of the well logging system; a humidity from the weather reporting station proximate to the physical location of the well logging system; and a dew point from the weather reporting station proximate to the physical location of the well logging system.

* * * * *